United States Patent [19]

Grünfeld

[11] Patent Number: 4,541,649
[45] Date of Patent: Sep. 17, 1985

[54] CONNECTIONS FOR TUBULAR BICYCLE FRAME AND FORK COMPONENTS AND METHOD OF MAKING THE SAME

[76] Inventor: Detmar Grünfeld, Am Brunnen 24, D-4980 Bünde, Fed. Rep. of Germany

[21] Appl. No.: 515,054

[22] PCT Filed: Nov. 11, 1982

[86] PCT No.: PCT/DE82/00216
§ 371 Date: Jul. 12, 1983
§ 102(e) Date: Jul. 12, 1983

[87] PCT Pub. No.: WO83/01763
PCT Pub. Date: May 26, 1983

[30] Foreign Application Priority Data
Nov. 12, 1981 [DE] Fed. Rep. of Germany ....... 3145002

[51] Int. Cl.⁴ .......................... B62K 3/04; B62K 19/12
[52] U.S. Cl. ................................ 280/281 R; 29/527.5; 403/269
[58] Field of Search ........................... 280/281 R, 274; 29/527.5; 164/98, 108; 403/269, 267

[56] References Cited

U.S. PATENT DOCUMENTS 4,145,068 3/1979 Toyomasu et al. ............. 280/281 R

FOREIGN PATENT DOCUMENTS

| 809768 | 8/1951 | Fed. Rep. of Germany . |
| 840660 | 6/1952 | Fed. Rep. of Germany . |
| 939848 | 3/1956 | Fed. Rep. of Germany . |
| 2725979 | 12/1977 | Fed. Rep. of Germany . |
| 945496 | 5/1949 | France . |
| 2033068 | 11/1970 | France . |

Primary Examiner—Joseph F. Peters, Jr.
Assistant Examiner—Donn M. McGiehan
Attorney, Agent, or Firm—Spencer & Frank

[57] ABSTRACT

A connection between at least one first tube and a second tube of a bicycle frame includes a flared terminus forming part of an end portion of the first tube. The flared terminus is in engagement with an outer surface of the second tube. An injection-molded one-piece plastic casing fully surrounds the end portion of the first tube and fully surrounds a circumferential portion of the outer surface of the second tube in a zone of the flared terminus.

7 Claims, 4 Drawing Figures

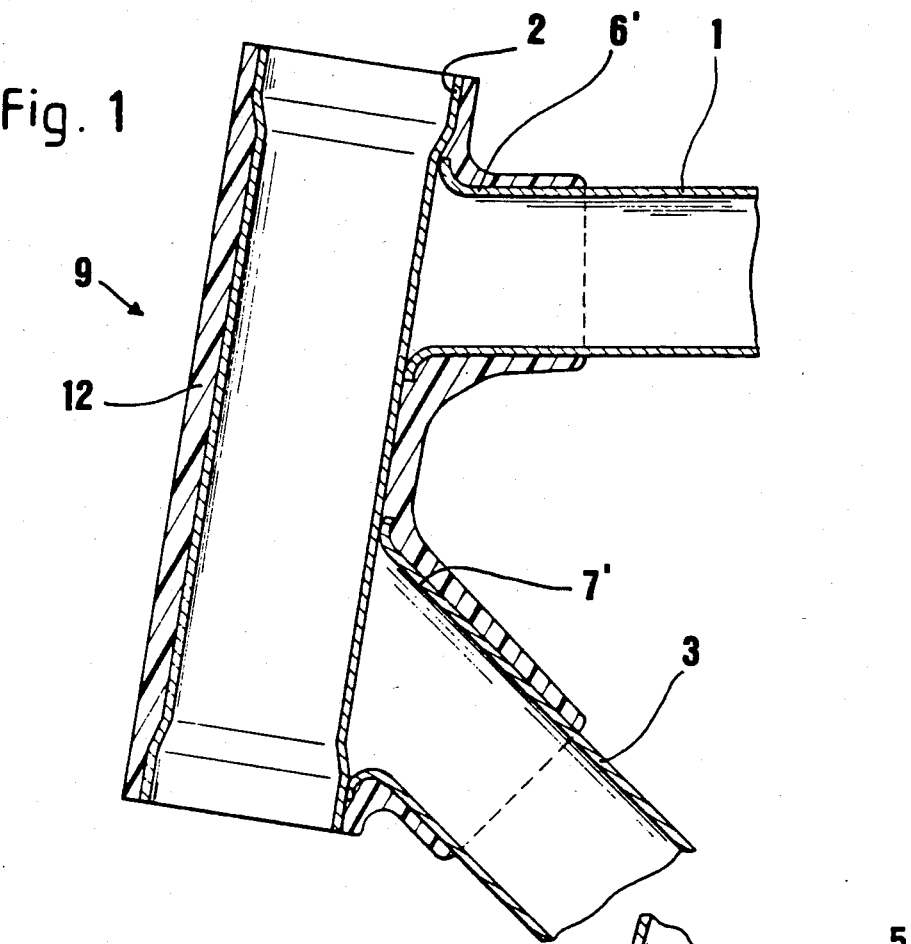
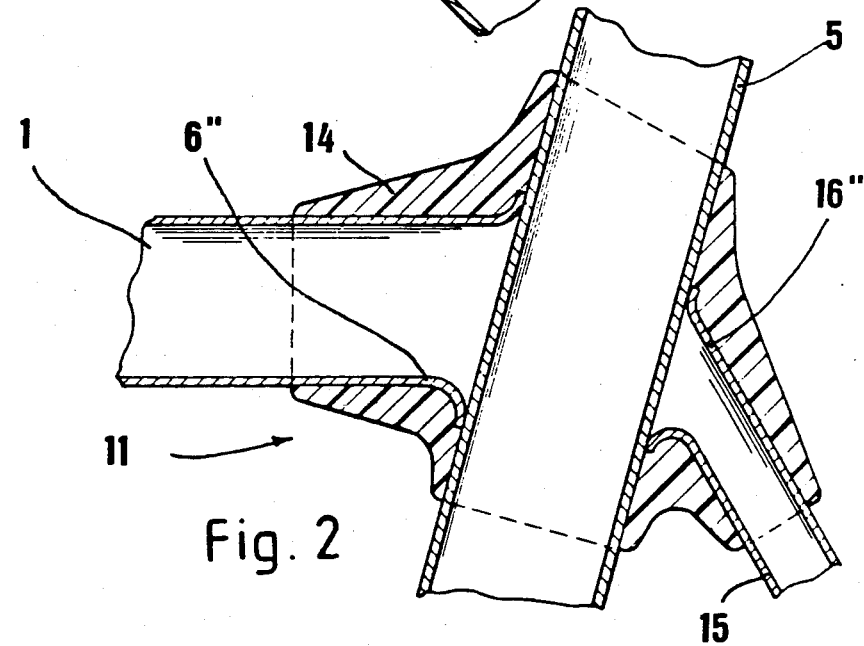

CONNECTIONS FOR TUBULAR BICYCLE FRAME AND FORK COMPONENTS AND METHOD OF MAKING THE SAME

BACKGROUND OF THE INVENTION

The invention relates to connections of tubular components for bicycle frames or forks, particularly steering head, bottom bracket bearing, seat head and center connections, wherein the shaped end section of at least one first tube is connected with the other jacket of a second tube by material injection-molded therearound, and to a method for producing such connections.

Such known connections are used in the manufacture of bicycle frames as a substitute for welded, soldered, screwed or riveted junctions as they are employed, in particular, in the production of sturdy children's bicycles and for folding bicycles as well as for modern aluminum bicycles.

The above-mentioned known connections are produced in a metal injection molding process at the end sections of the individual tubes to be connected, with the end sections of the frame tubes being shaped, for example, in the form of flanges and the open ends are closed off with caps. Although such bicycle frames are relatively strong with respect to static and dynamic loads, they have the drawback that the connections produced in this manner are relatively heavy and thus are not consistent with to the present-day trend in bicycle design, namely to produce a bicycle that is as light in weight as possible.

Another drawback of such a metal injection molding process is the considerable amount of time it requires. Moreover, the injection molding and soldering temperatures involved are very high, i.e. several hundred degrees Celsius. This may cause warping of the finished frames and it becomes necessary to correct the frame and the forks by way of aligning them. Moreover, depending on the selected connection process, the tubular frame sections must not exceed a certain wall thickness and no plastic components can be used for the tubular frame sections.

It is also a drawback that the frame sections cannot be lacquered before the metal injection molded connections are produced; thus, the lacquering process can take place only after the bicycle frame is completed.

SUMMARY OF THE INVENTION

It is an object of the invention to provide connections of the above-mentioned type and to provide a method for producing such connections wherein the above-mentioned drawbacks are avoided and which renders it possible to use steel and/or aluminum tubes as well as plastic tube sections for the bicycle frame to thus, in particular, reduce the weight of such frames. It is also an object of the invention to avoid the time and energy consuming connecting work that has necessitated the coating of the frame sections in a metal casting process and particularly the high injection-molding and soldering temperatures connected therewith.

These objects and others to become apparent as the specification progresses, are accomplished by the invention, according to which, briefly stated, the connection between at least one first tube and a second tube of a bicycle frame includes a flared terminus forming part of an end portion of the first tube. The flared terminus is in engagement with an outer surface of the second tube. An injection-molded one-piece plastic casing fully surrounds the end portion of the first tube and fully surrounds a circumferential portion of the outer surface of the second tube in a zone of the flared terminus.

Such connections can be made with significantly less expenditure of time and energy and, in particular, due to the low manufacturing temperatures, it is possible to lacquer the individual frame sections or frame parts already before they are assembled. Moreover, with the same stability, such connections are substantially lighter in weight and contribute to a reduction of the total weight of the bicycle. Due to the low manufacturing temperatures, warping of the finished frame does not occur.

As a further feature of the invention, the widened end sections of the respective pipes are glued to the outer jackets of the connecting tubes.

This further increases the stability of the bicycle frame and at the same time plastic can be prevented from entering into the open end sections during the injection-molding process.

Advantageously, the tubes are made of metal; however, the tubes forming the frame may also be made of a plastic. The use of plastic tubes is also made possible by the low manufacturing temperature.

As another advantageous feature of the invention, in addition to the tubes forming the bicycle frame, the rear section and its connecting ends at the bottom bracket bearing and at the seat head are also bound into the injection-molded plastic casing.

The method suitable for producing such connections, is accomplished in that the end sections of the tubes are widened and are adapted to the outer jackets of the respective other tubes, the tubes are then laid or placed into an injection molding device, in predetermined lengths and arrangement with respect to one another, and are encased in plastic at the junction locations.

As a further feature of the method according to the invention, the edges of the widened end sections of the first tubes, where they abut on the outer jackets of the other tubes, are provided with a suitable adhesive, then these edges are pressed onto the outer jackets so as to be glued thereto and then the tubes are encased in plastic at the junction locations.

The above outlined method according to the invention permits a considerable saving of time and energy costs, and, in particular, it facilitates the process of lacquering bicycle frames since the individual frame sections, particularly those made of metal, can be provided with a final lacquer coating before the connections are made.

BRIEF DESCRIPTION OF THE DRAWING

FIG. 1 is a longitudinal sectional view of a steering head of a bicycle frame, incorporating the invention.

FIG. 2 is a longitudinal sectional view of a seat head incorporating the invention.

DESCRIPTION OF THE PREFERRED EMBODIMENTS

Figure 3:
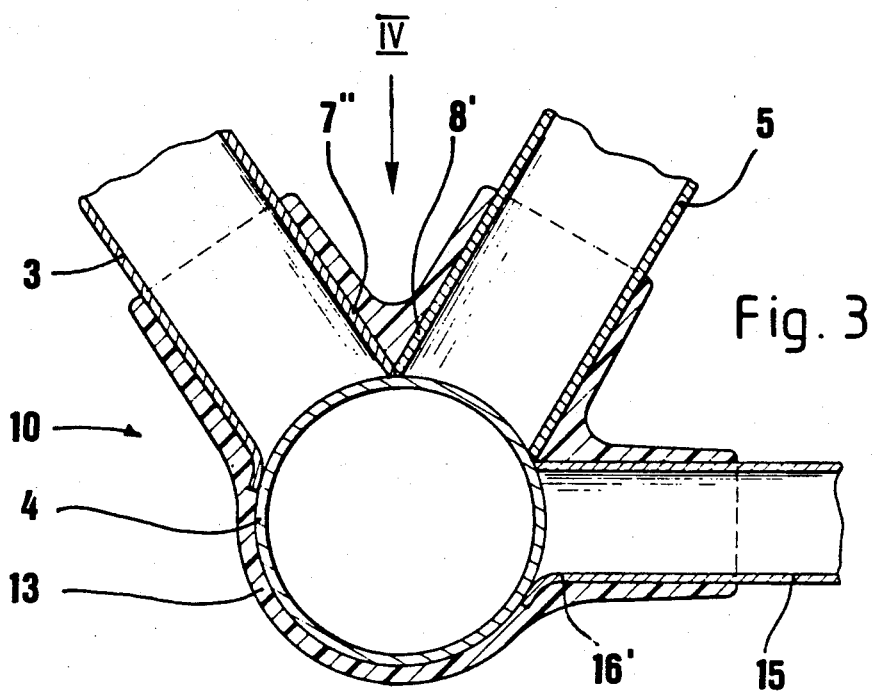
FIG. 3 is a longitudinal sectional view of the bottom bracket bearing incorporating the invention.

Before producing the individual connections of the bicycle frame shown in the drawing figures, the frame sections, namely upper tube 1, lower tube 3 FIG. 1 and seat tube 5 FIGS. 2 and 3 are given their predetermined lengths and are widened at their open end portions 6', 6'', 7', 7'' and 8. In this prepared form, the above-mentioned components are laid or placed, in the configuration of the bicycle frame to be produced, into a plastic injection-molding device together with the steering tube 2 and the bottom bracket bearing tube 4. The widened end portions 6', 6'', 7', 7'' and 8' of the frame sections 1, 3 and 5, respectively, contact the outer jackets of the steering tube 2, the bottom bracket bearing tube 4 and the seat tube 5, respectively. In order to increase stability, the tubes may also be glued together at these points of contact.

Thereafter, the above-mentioned frame components, namely the steering head 9, the bottom bracket bearing 10 and the seat head 11, are encased in plastic at their points of contact so that form stable connections are produced. The plastic casings are designated at 12 (FIG. 1), 13 (FIG. 3) and 14 (FIG. 2).

For women's bicycle, the upper tube 1 is made lower so that its end portion 6'' is not connected with the seat tube 5 directly below the seat, as is the case in the men's bicycle frame shown in the drawing figures, rather the connection, a so-called center connection, is placed closer toward the bottom bracket bearing tube 4.

Figure 4:
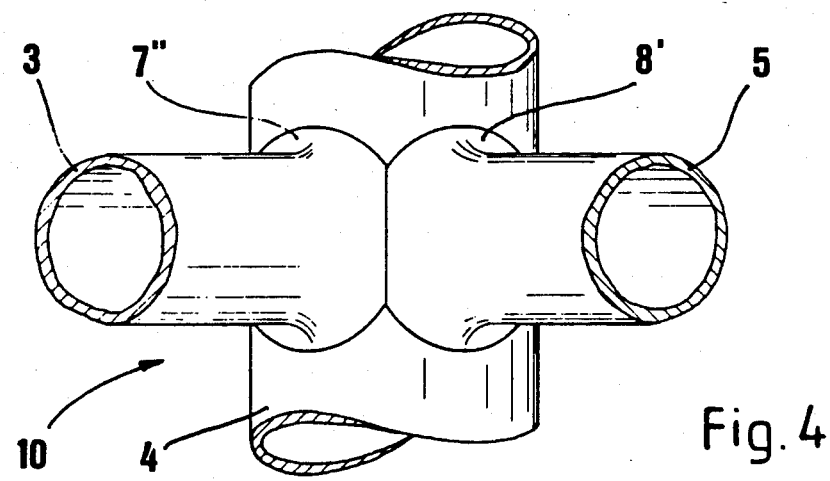
FIG. 4 is a plan view as seen in the direction of arrow IV of FIG. 3, of the bottom bracket bearing with the connecting sleeve and the rear section omitted incorporating the invention.

The rear frame construction 15 receiving the rear wheel of a bicycle, indicated in FIGS. 2 and 3 merely by its connecting ends 16' and 16'', respectively, is encased in plastic together with frame tubes 1, 3 and 5 in the seat head 11 and in the bottom bracket bearing head 10, respectively. FIG. 4 illustrates, in a top plan view of the tube structure of FIG. 3, how the flaring ends of tubes 3 and 5, situated side-by-side in the circumferential direction of the bottom bracket bearing tube 4 are arranged with respect to one another.

The plastic casings at the described junction points are produced in a manner known in the plastics art in a plastic injection molding device which is specially adapted to the configuration of a bicycle frame.

It will be understood that the above description of the present invention is susceptible to various modifications, changes and adaptations, and the same are intended to be comprehended within the meaning and range of equivalents of the appended claims.

What is claimed is:

1. A connection between at least one first tube and a second tube of a bicycle frame, said first tube having an end portion and said second tube having an outer surface; comprising a flared terminus forming part of said end portion; said flared terminus being in conforming engagement with said outer surface; and an injection-molded one-piece plastic casing fully surrounding said end portion of said first tube and fully surrounding a circumferential portion of said outer surface of said second tube in a zone of said flared terminus.

2. A connection as defined in claim 1, wherein said flared terminus is glued to said outer surface.

3. A connection as defined in claim 1, wherein said tubes are metal tubes.

4. A connection as defined in claim 1, wherein said tubes are plastic tubes.

5. A connection as defined in claim 1, wherein said first tube is present in a plurality; said one-piece casing fully surrounding the end portion of the respective first tubes.

6. A method of connecting a first tube, with an end thereof, to an outer surface of a second tube, comprising the following steps:
 (a) widening and shaping said end of said first tube to adapt said end to said outer surface;
 (b) positioning said first and second tubes such that said end of said first tube is maintained in engagement with said outer surface of said second tube; and
 (c) injection-molding a one-piece plastic casing about the first and second tube such that said casing fully surrounds said end of said first tube and fully surrounds areas of said outer surface of said second tube in a zone of said end of said first tube.

7. A method as defined in claim 6, further comprising the step of applying, after step (a) and before step (b) an adhesive on an intended area of contact between said first and second tubes; and subsequently pressing, before step (c), said first tube against said second tube.

* * * * *